United States Patent
Tao

(10) Patent No.: US 9,571,822 B2
(45) Date of Patent: Feb. 14, 2017

(54) DISPLAY SYSTEM WITH DISPLAY ADJUSTMENT MECHANISM FOR VIEWING AIDE AND METHOD OF OPERATION THEREOF

(71) Applicant: Samsung Electronics Co., Ltd., Gyeonggi-Do (KR)

(72) Inventor: Li Tao, Irvine, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 386 days.

(21) Appl. No.: 13/759,726

(22) Filed: Feb. 5, 2013

(65) Prior Publication Data

US 2014/0063210 A1    Mar. 6, 2014

Related U.S. Application Data

(60) Provisional application No. 61/694,177, filed on Aug. 28, 2012.

(51) Int. Cl.
| | | |
|---|---|---|
| H04N 17/00 | (2006.01) | |
| H04N 17/02 | (2006.01) | |
| H04N 13/04 | (2006.01) | |
| G09G 3/00 | (2006.01) | |

(52) U.S. Cl.
CPC .......... *H04N 13/0425* (2013.01); *G09G 3/006* (2013.01); *H04N 13/0477* (2013.01); *G09G 2320/0233* (2013.01); *G09G 2320/0242* (2013.01); *G09G 2320/0285* (2013.01); *G09G 2320/0693* (2013.01); *G09G 2360/145* (2013.01)

(58) Field of Classification Search
CPC ............ H04N 13/0425; H04N 13/0429; H04N 13/0436; H04N 13/0438; H04N 17/04; H04N 17/02; G09G 2380/00; G09G 2320/00; G09G 2320/02; G09G 2320/06
USPC .............................. 345/419; 348/51–59, 189
See application file for complete search history.

(56) References Cited

U.S. PATENT DOCUMENTS

| | | | |
|---|---|---|---|
| 7,869,619 B2 | 1/2011 | Herbert et al. | |
| 8,026,953 B2 | 9/2011 | Lammers et al. | |
| 8,269,822 B2* | 9/2012 | Zalewski | A63F 13/00 348/56 |
| 2010/0259603 A1* | 10/2010 | Mihara | H04N 13/0438 348/53 |
| 2011/0025821 A1* | 2/2011 | Curtis et al. | 348/43 |
| 2011/0134229 A1* | 6/2011 | Matsumoto | G02B 27/2264 348/56 |
| 2011/0149028 A1* | 6/2011 | Klebanov | H04N 13/0434 348/43 |
| 2011/0149048 A1* | 6/2011 | Tanaka | 348/51 |
| 2011/0164122 A1* | 7/2011 | Hardacker | 348/53 |
| 2011/0211051 A1* | 9/2011 | Park et al. | 348/53 |
| 2011/0216175 A1* | 9/2011 | Shimoyama | H04N 13/0438 348/56 |
| 2011/0234774 A1* | 9/2011 | Satoh | G02B 27/2264 348/56 |
| 2011/0249103 A1* | 10/2011 | Taniguchi | 348/56 |
| 2011/0285829 A1* | 11/2011 | Mori et al. | 348/53 |

(Continued)

*Primary Examiner* — Michael Lee
(74) *Attorney, Agent, or Firm* — IP Investment Law Group

(57) ABSTRACT

A method of operation of a display system includes: determining a correction profile for adjusting an intended image based on a viewing aide; and generating an adjusted output image based on the correction profile for displaying on a device and for perceiving the intended image through the viewing aide.

20 Claims, 5 Drawing Sheets

(56) References Cited

U.S. PATENT DOCUMENTS

| | | | |
|---|---|---|---|
| 2011/0298906 A1* | 12/2011 | Jung | H04N 13/0422 348/56 |
| 2012/0044331 A1* | 2/2012 | MacNaughton | H04N 13/0438 348/56 |
| 2012/0050506 A1* | 3/2012 | Shintani | 348/56 |
| 2012/0069160 A1* | 3/2012 | Ko | H04N 13/0429 348/54 |
| 2012/0075435 A1* | 3/2012 | Hovanky | H04N 13/02 348/51 |
| 2012/0098830 A1* | 4/2012 | Kim | G02B 27/2264 345/419 |
| 2012/0120209 A1* | 5/2012 | Umeda | G02B 27/2264 348/54 |
| 2012/0154526 A1* | 6/2012 | Ji | H04N 13/0007 348/43 |
| 2012/0154553 A1* | 6/2012 | Zustak et al. | 348/51 |
| 2012/0162400 A1* | 6/2012 | Iwanaka | G02B 27/2264 348/54 |
| 2012/0194657 A1* | 8/2012 | Ko | G02B 27/2264 348/56 |
| 2012/0236133 A1* | 9/2012 | Gallagher | H04N 13/0018 348/60 |
| 2012/0249759 A1* | 10/2012 | Thorson | G02B 27/2264 348/56 |
| 2012/0262477 A1* | 10/2012 | Buchheit | 345/619 |
| 2013/0010090 A1* | 1/2013 | Wang | H04N 17/04 348/56 |
| 2013/0027526 A1* | 1/2013 | Mao | 348/56 |
| 2013/0083011 A1* | 4/2013 | Geisner et al. | 345/419 |
| 2013/0257849 A1* | 10/2013 | Doherty et al. | 345/419 |
| 2013/0321412 A1* | 12/2013 | Coon et al. | 345/420 |
| 2014/0028811 A1* | 1/2014 | Ebersole | H04N 13/04 348/54 |
| 2014/0282646 A1* | 9/2014 | McCoy et al. | 725/12 |

* cited by examiner

DISPLAY SYSTEM WITH DISPLAY ADJUSTMENT MECHANISM FOR VIEWING AIDE AND METHOD OF OPERATION THEREOF

CROSS-REFERENCE TO RELATED APPLICATION(S)

This application claims the benefit of U.S. Provisional Patent Application Ser. No. 61/694,177 filed Aug. 28, 2012, and the subject matter thereof is incorporated herein by reference thereto.

TECHNICAL FIELD

The embodiment of the present invention relates generally to a display system, and more particularly to a system with display enhancement mechanism.

BACKGROUND

Modern consumer and industrial electronics, especially devices such as graphical display systems, televisions, projectors, cellular phones, portable digital assistants, and combination devices, are providing increasing levels of functionality to support modern life including three-dimensional display services. Research and development in the existing technologies can take a myriad of different directions.

As users adopt the advancements in devices, new and old usage begin to take advantage of this new technology. Similarly, display systems and service providers are continually making improvement in the user's experience to be competitive. However, the new technology has also brought new challenges that degrade the viewing experience in different ways.

The desire to provide accurate and clear visual depictions in electronic devices has served as a motivating factor in the innovation of display devices. This is especially true with advancements in high definition displays and three dimensional displays.

Thus, a need still remains for a three-dimensional display system with display enhancement mechanism to display three-dimensional images. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

The embodiment of the present invention provides a method of operation of a display system including: determining a correction profile for adjusting an intended image based on a viewing aide; and generating an adjusted output image based on the correction profile for displaying on a device and for perceiving the intended image through the viewing aide.

The embodiment of the present invention provides a method of operation of a display system including: displaying a calibration output for calibrating using a display interface; detecting a displayed image quality for measuring the calibration output directly from the display interface; detecting an altered image quality for measuring the calibration output through a viewing aide; determining a correction profile based on the displayed image quality and the altered image quality for displaying an intended image adjusted by the correction profile on a device; and generating an adjusted output image based on the correction profile for displaying on the device and for perceiving the intended image through the viewing aide.

The embodiment of the present invention provides a display system, including: a profile determination module for determining a correction profile for adjusting an intended image based on a viewing aide; and a compensation module, coupled to the profile determination module, for generating an adjusted output image based on the correction profile for displaying on a device and for perceiving the intended image through the viewing aide.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
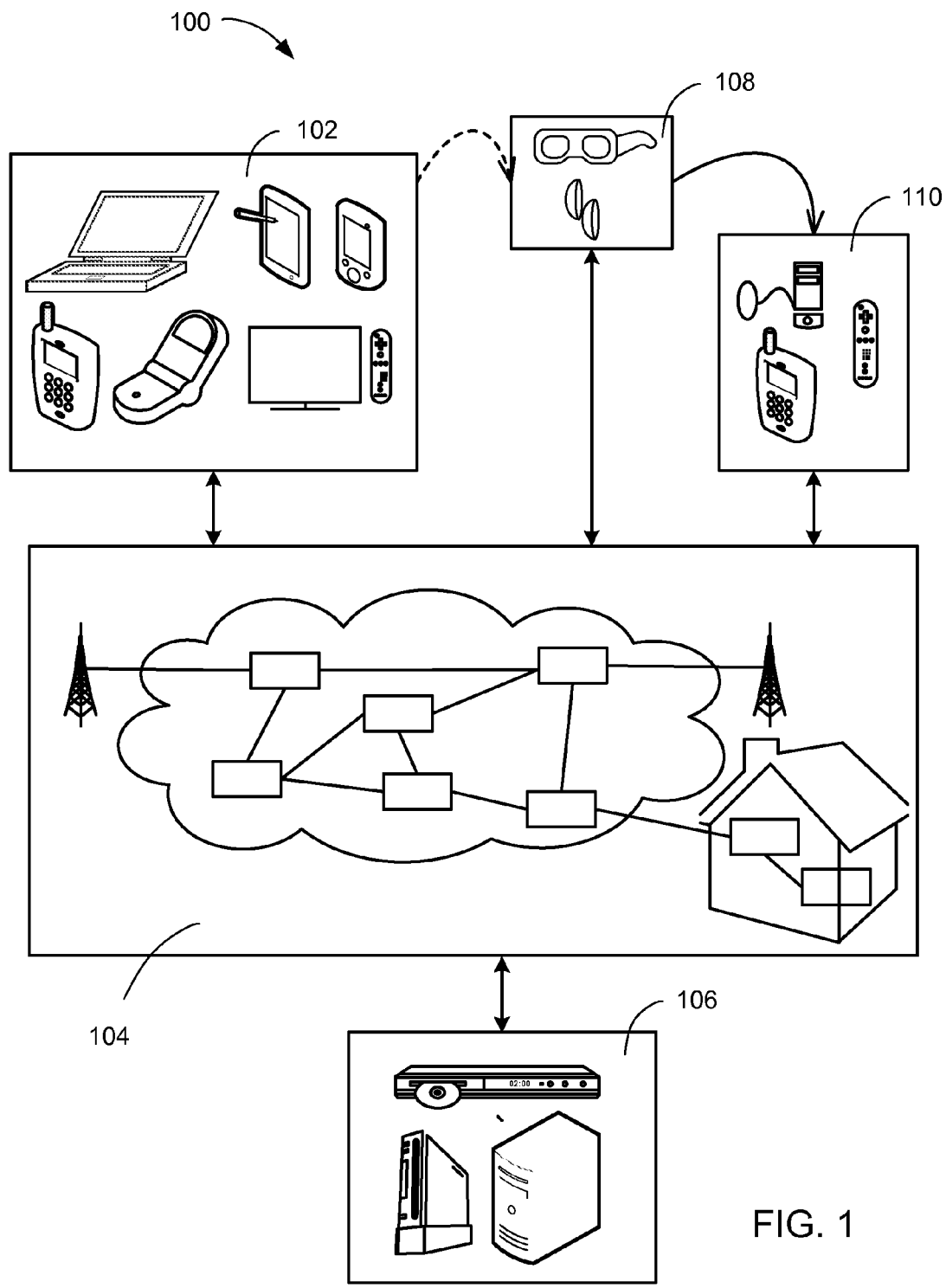
FIG. 1 is a display system with display enhancement mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

The following embodiments can be used to adjust a displayed image quality to produce an altered image quality in an adjusted output image. The adjustment can enable a viewer using a viewing aide to view the adjusted output image and perceive an intended image based on a transmission property of the viewing aide. The following embodiments using the adjusted output image and the adjusted coordinates provide accurate depiction viewing of the intended image through the viewing aide. The adjusted output image based on a correction profile can provide corrections to negate transmission property of the viewing aide.

The following embodiments can further use a displayed image quality, the altered image quality, a displayed gamut, and an altered gamut to provide characterization of the transmission property of the viewing aide, which can further be quantized and processed.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

One skilled in the art would appreciate that the format with which image information is expressed is not critical to some embodiments of the invention. For example, in some embodiments, image information is presented in the format of (X, Y); where X and Y are two coordinates that define the location of a pixel in an image.

In an alternative embodiment, three-dimensional image information is presented by a format of (X, Y, Z) with related information for color of the pixel. In a further embodiment of the present invention, the three-dimensional image information also includes an amount value or brightness element.

The term "image" referred to herein can include a two-dimensional image, three-dimensional image, video frame, a computer file representation, an image from a camera, a video frame, or a combination thereof. For example, the image can be a machine readable digital file, a physical photograph, a digital photograph, a motion picture frame, a video frame, an x-ray image, a scanned image, or a combination thereof.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a display system 100 with image conversion mechanism in an embodiment of the present invention. The display system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, a notebook computer, a liquid crystal display (LCD) system, a light emitting diode (LED) system, or other multi-functional display or entertainment device. The first device 102 can couple, either directly or indirectly, to the communication path 104 to communicate with the second device 106 or can be a stand-alone device.

For illustrative purposes, the display system 100 is described with the first device 102 as a display device, although it is understood that the first device 102 can be different types of devices. For example, the first device 102 can also be a device for presenting images or a multi-media presentation. A multi-media presentation can be a presentation including sound, a sequence of streaming images or a video feed, or a combination thereof. As an example, the first device 102 can be a high definition television, a three dimensional television, a computer monitor, a personal digital assistant, a cellular phone, or a multi-media set.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a Blu-ray Disc (BD) player, a three-dimension enabled DVD or BD player, a recording device, such as a camera or video camera, or a combination thereof. In another example, the second device 106 can be a signal receiver for receiving broadcast or live stream signals, such as a television receiver, a cable box, a component in a broadcasting system, a satellite dish receiver, or a web enabled device.

The second device 106 can be centralized in a single room, distributed across different rooms, distributed across different geographical locations, embedded within a telecommunications network. The second device 106 can couple with the communication path 104 to communicate with the first device 102.

For illustrative purposes, the display system 100 is described with the second device 106 as a computing device, although it is understood that the second device 106 can be different types of devices. Also for illustrative purposes, the display system 100 is shown with the second device 106 and the first device 102 as end points of the communication path 104, although it is understood that the display system 100 can have a different partition between the first device 102, the second device 106, and the communication path 104. For example, the first device 102, the second device 106, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

The display system 100 can further include a viewing aide 108 and an image analyzer 110. The viewing aide 108 is an apparatus or a device that controls or enhances the viewing of images depicted on the first device 102. The viewing aide 108 can be coupled with the first device 102. The viewing aide 108 can enable, disable, filter, adjust, or perform a combination thereof for the images displayed by the first device 102 for viewing or depicting the intended image.

The viewing aide 108 can be wearable. For example, the viewing aide 108 can be 3D glasses or lenses used to filter the light from different sources on the first device 102, such as shutter type or polarized type glasses, to create a three-dimensional (3D) viewing effect.

The viewing aide 108 can be coupled to the first device 102, the second device 106, or a combination thereof via the communication path 104. For example, the viewing aide 108 can have wired, radio frequency identification (RFID), or Bluetooth (TM) capabilities to communicate with the first device 102, the second device 106, or a combination thereof. The first device 102, the second device 106, or a combination thereof can use the communication to identify the viewing aide 108 or receive image processing information, and adjust the operations of the viewing aide 108 accordingly. Also for example, the viewing aide 108 can have RFID, Bluetooth, WiFi, infrared, or a combination of communication capabilities thereof for communicating with the first device 102, the second device 106, other instances or types of viewing aides, or a combination thereof.

The image analyzer 110 is a device that detects different wavelengths of light. The image analyzer 110 can be a color analyzer and detect different colors. The image analyzer 110 can also determine the different components making up the identified color. The image analyzer 110 can be a separate stand-alone device, such as a separate color analyzer device or system, or a functional portion of a comprehensive device, such as a computer system or a smart phone having color identification functionality. For example, the image analyzer 110 can be part of the first device 102, such as an accessory to a computer or as part of a television remote controller.

The image analyzer 110 can be coupled to the first device 102, the second device 106, or a combination thereof via the communication path 104. For example, the image analyzer 110 can have RFID, Bluetooth, WiFi, infrared, or a combination of communication capabilities thereof for communicating with the first device 102, the second device 106, the viewing aide 108, or a combination thereof.

For illustrative purposes the viewing aide 108 and the image analyzer 110 are shown as being separate devices. However, it is understood that the first device 102, the second device 106, or a combination thereof can have the viewing aide 108, the image analyzer 110, or a combination thereof as a functional portion or unit therein. For example, the first device 102 can have the viewing aide 108 as a functioning portion of the television or have the image analyzer 110 on a television remote controller. Also for example, the second device 106, such as a smartphone or a media player, can have the image analyzer 110 as a functioning unit therein.

Figure 2:
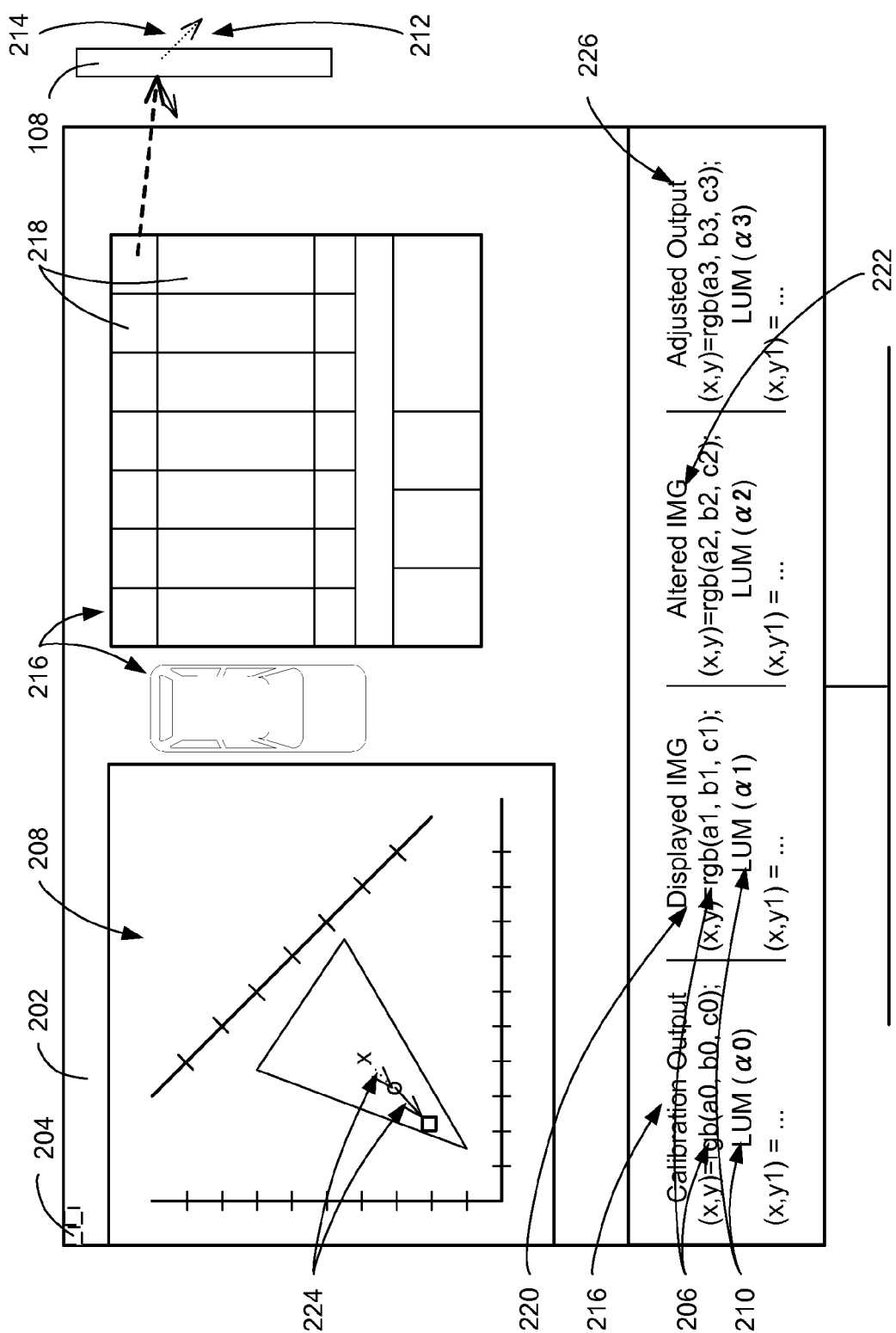
FIG. 2 is an example of a display interface of the first device of FIG. 1.

Referring now to FIG. 2, therein is shown an example of a display interface 202 of the first device 102 of FIG. 1. The display interface 202 can have pixels 204. The pixels 204 are individual controllable elements of the display interface 202. The pixels 204 can each be the individually controlled element in visually depicting images on the first device 102. The pixels 204 can each have an address or an identifier corresponding to their physical locations on the first device 102. Each of the pixels 204 can be given a color value 206 for representing the image.

The color value 206 of each of the pixels 204 can be a multi-component or multi-element mathematical quantity. Each component corresponds to a chromaticity value for a specific color, for example, the color value 206 can include component values for red, green, blue, cyan, magenta, yellow, black, or a combination thereof. The color value 206 can also be a two-component chromaticity value.

The display system 100 can include a color gamut 208. The color gamut 208 is a set of colors that can be represented with the display system 100. The color gamut 208 can be a property of a device or a component in the display system 100 and be specific to the display system 100, components therein, or a combination thereof. The color gamut 208 can be a range for the color value 206 that can be assigned to or represented by each of the pixels 204 given the capabilities of the first device 102, the second device 106 of FIG. 1, the display system 100, the communication path 104 of FIG. 1, or a combination thereof.

For example, the color gamut 208 can be represented as various colors within a graph in the chromatic space, with each color matching a specific instance of the color value 206 corresponding to values along various axes of the graph. Also for example, the color gamut 208 can be characterized by a shape, size, location, or a combination thereof on the graph according to the capabilities of the first device 102, the second device 106, the communication path 104, or a combination thereof.

As a detailed example, the color gamut 208 can be characterized by a shape of a triangle. Left corner of the triangle can have a blue color, right corner of the triangle have a red color, and the top corner of the triangle can have a green color. The triangle can have colors that are gradual blends of corresponding colors moving from one corner to another.

Each of the pixels 204 can also have a brightness value 210. The brightness value 210 is information representing brightness. For example, the brightness value 210 can be a scaled combination or sum of the components within the color value 206. Also for example, the brightness value 210 can be information for controlling the amount value of backlight in the display interface 202. The brightness value 210 can also be independent of the color value 206.

The display system 100 can display images on the first device 102 that can be viewed through the viewing aide 108. The viewing aide 108 can have a transmission property 212 due to the inherent properties of the material for the viewing aide 108, the physical structure of the viewing aide 108, such as in outer shape thereof or layers therein, or a combination thereof.

The transmission property 212 is an inherent aspect of the viewing aide 108 that causes the viewing aide 108 to alter properties of light traversing through the viewing aide 108. The viewing aide 108 can cause a wavelength dependent attenuation of the light passing through the viewing aide 108. The attenuation of the transmitted light intensity is created by light reflection and absorption induced by the viewing aide 108. Due to the wavelength dependency, the user can sense both brightness degradation and color change when watching the displayed image through the viewing aide 108. The wavelength dependent transmission property of the viewing aide 108 can be detected and characterized by the image analyzer 110 with the displayed image, the calibration output 216, or a combination hereof.

The display system 100 can adjust the display images on the first device 102 to compensate for transmission property 212 of the viewing aide 108. For example, the display system 100 can adjust the images on the 3D television or monitor to compensate the inherent properties of the 3D glasses and have the viewer perceive the originally intended images, colors, or both through the viewing aide 108. Details regarding the operation of the display system 100 will be described below.

The display system 100 can have a calibration output 216 displayed on the display interface 202. The calibration output 216 can be an image having multiple instances of a color test zone 218, each displaying previously designated colors having predetermined instances of the color value 206, the brightness value 210, or a combination thereof. The calibration output 216 can also be sequence of known colors having predetermined instances of the color value 206, the brightness value 210, or a combination thereof displayed on the display interface 202 in predetermined sequence and durations.

The display system 100 can detect a displayed image quality 220 directly from the display interface 202 and an altered image quality 222 from through the viewing aide 108. The display system 100 can use the image analyzer 110 of FIG. 1 to detect the displayed image quality 220, the altered image quality 222, or a combination thereof.

The displayed image quality 220 is a measurable quality of an image displayed on the display interface 202. The displayed image quality 220 can be the measurable quality for one or more instance of the pixels 204 displayed on the display interface 202. The displayed image quality 220 can be the measurable quality of the image as measured directly from the display interface 202, without using the viewing aide 108. The displayed image quality 220 can be a set of values representing the image that the viewer would see directly from the display interface 202. The displayed image quality 220 can be represented by the color value 206, the brightness value 210, or a combination thereof directly detected from the image displayed on the display interface 202.

The displayed image quality 220 can be different from the calibration output 216 due to settings or qualities of the display interface 202. The displayed image quality 220 can also be same as the calibration output 216.

The altered image quality 222 is a measurable quality of an image displayed on the display interface 202 and detected through the viewing aide 108. The altered image quality 222 can be the measurable quality for one or more instance of the pixels 204 displayed on the display interface 202 that is detected through the viewing aide 108. The altered image quality 222 can be a set of values representing the image that the viewer would see on the display interface 202 through the viewing aide 108. The altered image quality 222 can be represented by the color value 206, the brightness value 210, or a combination thereof detected through the viewing aide 108 of the image displayed on the display interface 202.

The display system 100 can further use the calibration output 216 to detect the displayed image quality 220, the altered image quality 222, or a combination thereof. For example, the calibration output 216 can be an image of a purple car and have one or a group of the pixels 204 located at position (x, y) have predetermined color specific intensities of a0, b0, and c0 for red, green, and blue amount value values for the color purple. The calibration output 216 can have the brightness value 210 of α0.

Continuing with the example, the display system 100 can detect the displayed image quality 220 directly from the display interface 202 at the same physical location. The image analyzer 110 can determine the color of the purple car displayed on the display interface 202 as having the color value 206 representing a different shade of purple of (a1, b1, c1) with the brightness value 210 of α1 than the calibration output 216.

Continuing with the example, the display system 100 can also detect the altered image quality 222 through the viewing aide 108. The image analyzer 110 can determine the color of the purple car as purple when seen through the 3D glasses at the same physical location, represented by the color value 206 of (a2, b2, c2) with the brightness value 210 of α2.

The displayed image quality 220 and the altered image quality 222 can correspond to colors, locations, or a combination thereof on the color gamut 208. For illustrative purposes, the displayed image quality 220 is shown as 'o' and the altered image quality 222 is shown as 'x'. However, it is understood that the displayed image quality 220 and the altered image quality 222 can be represented in various other ways and at locations corresponding to one or more values of the displayed image quality 220 and the altered image quality 222 on the color gamut 208.

The display system 100 can have a correction profile 224 and an adjusted output image 226. The correction profile 224 is an adjustment or a set of adjustments to the color value 206, the brightness value 210, or a combination thereof for displaying the image to be perceived as intended through the viewing aide 108. The correction profile 224 can be based on transmission property 212.

The correction profile 224 can be determined based on the displayed image quality 220, the altered image quality 222, or a combination thereof. The displayed image quality 220, the altered image quality 222, or a combination thereof can be measured by the image analyzer 110.

The correction profile 224 can describe relationship between the displayed image quality 220 and the altered image quality 222, between the altered image quality 222 and an adjusted image quality of the adjusted output image 226. For example, the correction profile 224 can be represented by an arrow pointing from the altered image quality 222, as represented by an 'x', to the displayed image quality 220, as represented by an 'o' on the color gamut 208 as shown in FIG. 2. Also for example, the correction profile 224 can be represented by a further arrow pointing from the displayed image quality 220 to the adjusted image quality of the adjusted output image 226, represented by a square. Details regarding the determination of the correction profile 224 will be discussed below.

For illustrative purposes, the correction profile 224 is shown as a set of two arrows. However, it is understood that the correction profile 224 can be represented differently. For example, the correction profile 224 can be an adjustment including an offset value, a multiplicative factor, polynomial function, an equation, a vector, or a combination thereof. Also for example, the correction profile 224 can be a set of adjustments corresponding to various instances of the color value 206, the brightness value 210, or a combination thereof, including a database or a look up table, a mapping of or a link between values, a set of coefficients for an adaptive filter, or a combination thereof.

The adjusted output image 226 is an image having the color value 206, the brightness value 210, or a combination thereof adjusted according to the correction profile 224. The adjusted output image 226, when displayed on the display interface 202 and perceived through the viewing aide 108, can produce the intended image having intended brightness, intended color, or a combination thereof.

Figure 3:
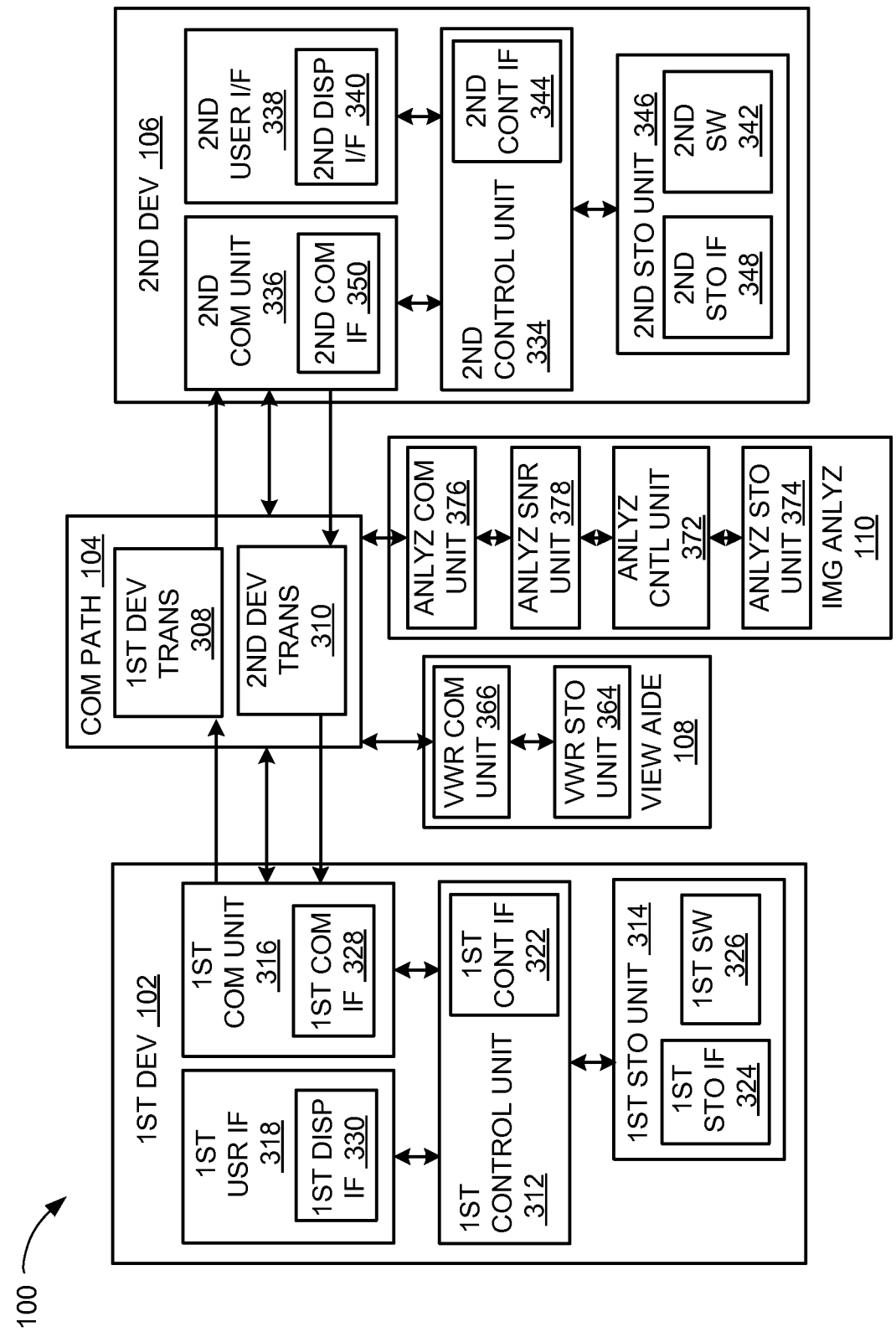
FIG. 3 is an exemplary block diagram of the display system.

Referring now to FIG. 3, therein is shown an exemplary block diagram of the display system 100. The display system 100 can include the first device 102, the communication path 104, and the second device 106. The first device 102 can send information via a first device transmission 308 over the communication path 104 to the second device 106. The second device 106 can send information via a second device transmission 310 over the communication path 104 to the first device 102.

For illustrative purposes, the display system 100 is shown with the first device 102 as a client device, although it is understood that the display system 100 can have the first device 102 as a different type of device. For example, the first device 102 can be a server having a display interface.

Also for illustrative purposes, the display system 100 is shown with the second device 106 as a server, although it is understood that the display system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of the embodiment of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the display system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the first storage unit 314 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a desktop computer, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330 as an output device, such as the display interface 202 of FIG. 2. The first display interface 330 can include a display, a projector, a video screen, a speaker, or any combination thereof.

The first control unit 312 can operate the first user interface 318 to display information generated by the display system 100. The first control unit 312 can also execute the first software 326 for the other functions of the display system 100. The first control unit 312 can further execute the first software 326 for interaction with the communication path 104 via the first communication unit 316.

The second device 106 can be optimized for implementing the embodiment of the present invention in a multiple device embodiment with the first device 102. The second device 106 can provide the additional or higher performance processing power compared to the first device 102. The second device 106 can include a second control unit 334, a second communication unit 336, and a second user interface 338, and a second storage unit 346.

The second user interface 338 allows a user (not shown) to interface and interact with the second device 106. The second user interface 338 can include an input device and an output device. Examples of the input device of the second user interface 338 can include a keypad, a touchpad, softkeys, a keyboard, a microphone, or any combination thereof to provide data and communication inputs. Examples of the output device of the second user interface 338 can include a second display interface 340. The second display interface 340 can include a display, such as a projector, a video screen, a speaker, or any combination thereof.

The second control unit 334 can execute a second software 342 to provide the intelligence to the second device 106 of the display system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the display system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second controller interface 344 can also be used for communication that is external to the second device 106.

The second control interface 344 can receive information from the other functional units or from external sources, or can transmit information to the other functional units or to external destinations. The external sources and the external destinations refer to sources and destinations external to the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the information such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the display system 100 is shown with the second storage unit 346 as a single hierarchy storage system, although it is understood that the display system 100 can have the second storage unit 346 in a different configuration. For example, the second storage unit 346 can be formed with different storage technologies forming a memory hierarchical system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the second storage unit 346 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104.

The display system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be included in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the display system 100 is described by operation of the first device 102 and the second device 106. It is understood that the first device 102 and the second device 106 can operate any of the modules and functions of the display system 100.

The viewing aide 108 and the image analyzer 110 can have similarly functioning hardware units. For example, the viewing aide 108 can have a viewer storage unit 364, a viewer communication unit 366, or a combination thereof. The viewer storage unit 364 can be a memory device performing similar functions as the first storage unit 314, the second storage unit 346, or a combination thereof.

The viewer communication unit 366 can be a communication device performing similar functions as the first communication unit 316, the second communication unit 336, or a combination thereof. For example, the viewer communication unit 366 can be used to communicate commands, statuses, identification information, the correction profile 224 of FIG. 2, or a combination thereof stored in the viewer storage unit 364. The command can be communicated between the first device 102, the second device 106, the viewing aide 108, or a combination thereof.

Also for example, the image analyzer 110 can have an analyzer control unit 372, an analyzer storage unit 374, an analyzer communication unit 376, an analyzer sensor unit 378, or a combination thereof. The analyzer control unit 372 can be similar to the first control unit 312, the second control unit 334, or a combination thereof.

The analyzer storage unit 374 can be similar to the first storage unit 314, the second storage unit 346, the viewer storage unit 364, or a combination thereof. The analyzer communication unit 376 can be similar to the first communication unit 316, the second communication unit 336, the viewer communication unit 366, or a combination thereof.

The analyzer sensor unit 378 can be an optical sensor for detecting different wavelengths of light. The analyzer sensor unit 378 can be a hardware device for detecting different colors. The analyzer sensor unit 378 can be one or more cameras or optical sensors.

For example, the image analyzer 110 can detect an image or a color with the analyzer sensor unit 378. The image analyzer 110 can identify and determine the detected color or a color within the detected image with the analyzer control unit 372. The determined color can be stored in the analyzer storage unit 374, communicated through the analyzer communication unit 376, or a combination thereof.

For illustrative purposes, the viewing aide 108 and the image analyzer 110 are shown as separate devices from the first device 102 and the second device 106. However, it is understood that the viewing aide 108 and the image analyzer 110 can be functional units of the first device 102, the second device 106, or a combination thereof.

For example, the viewing aide 108 and the image analyzer 110 can be integrated together as 3D glasses having color sensing capabilities. Such 3D glasses can be part of the first device 102 or the second device 106. Also for example, the image analyzer 110 can be on a remote controller as a functioning unit of the first device 102 or be on a computer or a smart phone as a function unit of the second device 106.

Figure 4:
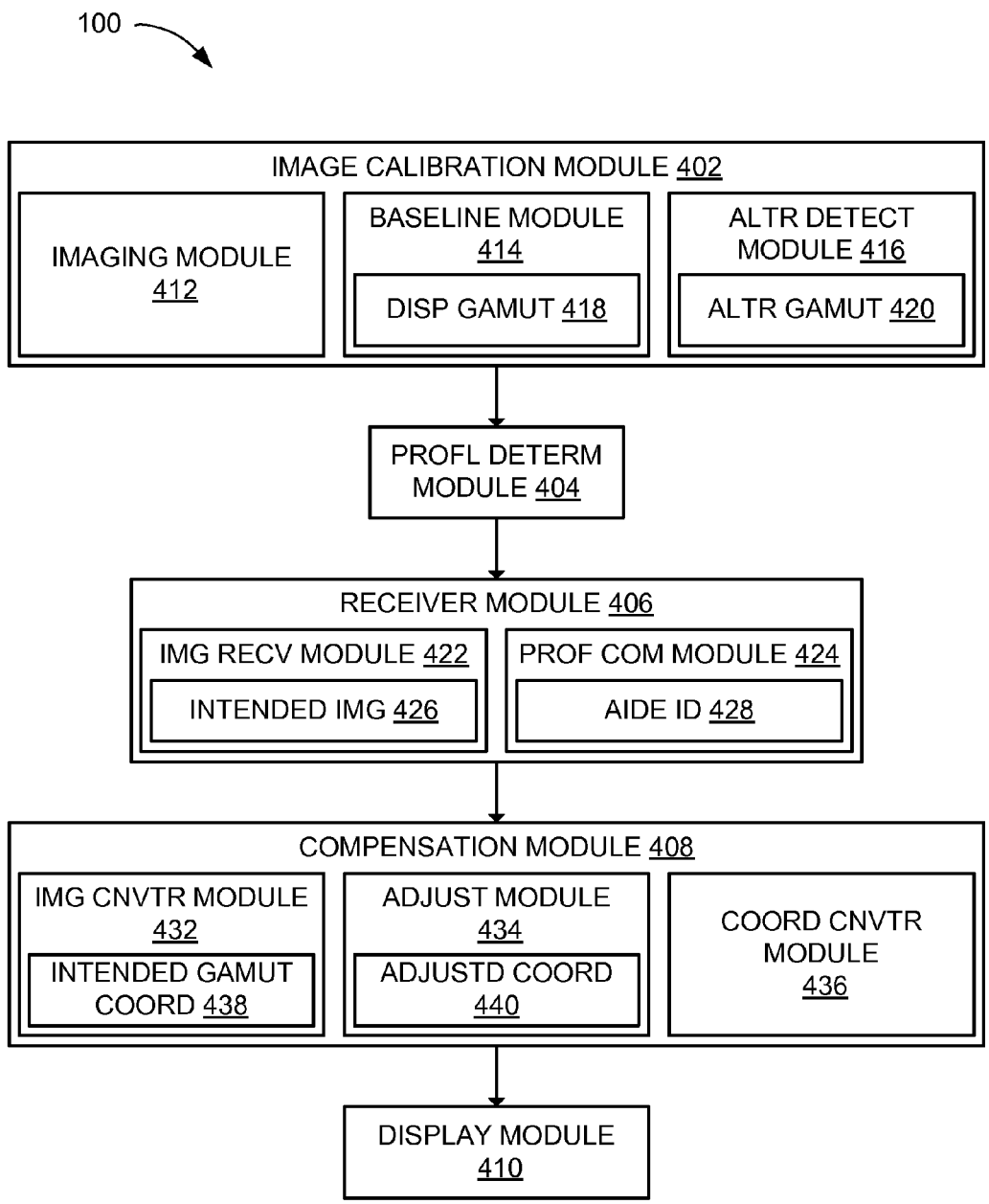
FIG. 4 is a control flow of the display system.

Referring now to FIG. 4, therein is shown a control flow of the display system 100. The display system 100 can include an image calibration module 402, a profile determination module 404, a receiver module 406, a compensation module 408, and a display module 410. The image calibration module 402 can be coupled to the profile determination module 404, which can be coupled to the receiver module 406. The receiver module 406 can further be coupled to the compensation module 408, which can be coupled to the display module 410.

The image calibration module 402 is for characterizing the transmission property 212 of FIG. 2, or a combination thereof of the viewing aide 108 of FIG. 1. The image calibration module 402 can detect the transmission property 212 by communicating the calibration output 216 of FIG. 2 with the first display interface 330 of FIG. 3, detecting the displayed image quality 220 of FIG. 2 directly from the display interface 330, and detecting the altered image quality 222 of FIG. 2 through the viewing aide 108.

The image calibration module 402 can include an imaging module 412, a baseline module 414, and an alteration detection module 416. The imaging module 412 is for communicating the calibration output 216. The imaging module 412 can use the first control unit 312 of FIG. 3, the second control unit 334 of FIG. 3, or a combination thereof to access the calibration output 216 stored in the first storage unit 314 of FIG. 3, the second storage unit 346, or a combination thereof.

The imaging module 412 can communicate the calibration output 216 by sending or receiving the calibration output 216 between the first device 102 of FIG. 1 and the second device 106 of FIG. 1. The imaging module 412 can also communicate the calibration output 216 by displaying the calibration output 216 on the first display interface 330. The imaging module 412 can display the calibration output 216 to be viewed by the user, the image analyzer 110, or a combination thereof to communicate the calibration output 216.

The baseline module 414 is for detecting the displayed image quality 220 directly from the display interface 330. The baseline module 414 can detect the displayed image quality 220 by detecting the calibration output 216 displayed on the first display interface 330. The baseline module 414 can detect the displayed image quality 220 directly by receiving light emitted from the first display interface 330 directly at the image analyzer 110 of FIG. 1.

The image analyzer 110 can have light wavelength detectors each detecting a specific wavelength of light in the analyzer sensor unit 378 of FIG. 3. The baseline module 414 can detect the displayed image quality 220 by receiving the light from the calibration output 216. The received light can trigger one or more of the light wavelength detectors. The baseline module 414 can determine the displayed image quality 220 by assigning the color associated with the responding detector within the analyzer sensor unit 378.

The image analyzer 110 can also receive the light emitted by the first display interface 330 displaying the calibration output 216 with a camera in the analyzer sensor unit 378.

The analyzer sensor unit 378 can determine the color value 206 of FIG. 2, the brightness value 210 of FIG. 2, or a combination thereof for the light received by the camera. The analyzer sensor unit 378 can determine the displayed image quality 220 by assigning the color value 206, the brightness value 210, or a combination thereof from the camera as the displayed image quality 220.

For example, the baseline module 414 can detect the displayed image quality 220 directly by receiving the emitted light travelling directly from the first display interface 330 to the analyzer sensor unit 378 without traveling through any filters or devices. For a more specific example, the baseline module 414 can receive the emitted light from the first device 102 with the analyzer sensor unit 378 on a smart phone, a TV remote controller, or a color analyzer device without the emitted light travelling through the viewing aide 108, such as 3D glasses or other lenses.

The baseline module 414 can detect the displayed image quality 220 as a color, brightness, or a combination thereof corresponding to the calibration output 216. The baseline module 414 can represent the displayed image quality 220 with the color value 206, the brightness value 210, or a combination thereof.

The baseline module 414 can also calculate a displayed gamut 418 based on the displayed image quality 220. The displayed gamut 418 is a set of values representing a location on the color gamut 208 of FIG. 2 corresponding to the displayed image quality 220.

The baseline module 414 can match the displayed image quality 220 to a color in the color gamut 208. The baseline module 414 can match an instance of the color value 206, the brightness value 210, or a combination thereof of the displayed image quality 220 to an instance of the color value 206, the brightness value 210, or a combination thereof on the color gamut 208.

The baseline module 414 can calculate the displayed gamut 418 as a set of coordinate values representing the location on the color gamut 208 having the color matching the displayed image quality 220. The baseline module 414 can store the displayed image quality 220, the displayed gamut 418, or a combination thereof in the first storage unit 314, the second storage unit 334, the analyzer storage unit 374 of FIG. 3, or a combination thereof.

The alteration detection module 416 is for detecting the altered image quality 222 through the viewing aide 108. The alteration detection module 416 can detect the altered image quality 222 by detecting the calibration output 216 displayed on the first display interface 330 through the viewing aide 108. The alteration detection module 416 can detect the altered image quality 222 by receiving light emitted from the first display interface 330 after the emitted light travels through the viewing aide 108.

For example, the alteration detection module 416 can detect the altered image quality 222 by receiving the emitted light travelling from the first display interface 330, through the viewing aide 108, to the analyzer sensor unit 378 of FIG. 3. For a more specific example, the alteration detection module 416 can receive the emitted light from the first device 102 with the analyzer sensor unit 378 on a smart phone, a TV remote controller, or a color analyzer device with the emitted light travelling through the viewing aide 108, such as 3D glasses or other lenses.

The alteration detection module 416 can detect the altered image quality 222 as a color, brightness, or a combination thereof corresponding to the calibration output 216 viewed through the viewing aide 108. The alteration detection module 416 can represent the altered image quality 222 with the color value 206, the brightness value 210, or a combination thereof.

The alteration detection module 416 can also calculate an altered gamut 420 based on the altered image quality 222. The displayed gamut 418 is a set of values representing a location on the color gamut 208 of FIG. 2.

The alteration detection module 416 can match the altered image quality 222 to a color in the color gamut 208. The alteration detection module 416 can match an instance of the color value 206, the brightness value 210, or a combination thereof of the altered image quality 222 to an instance of the color value 206, the brightness value 210, or a combination thereof on the color gamut 208.

The alteration detection module 416 can calculate the altered gamut 420 as a set of coordinate values representing the location on the color gamut 208 having the color matching the altered image quality 222. The alteration detection module 416 can store the altered image quality 222, the altered gamut 420, or a combination thereof in the first storage unit 314, the second storage unit 334, the analyzer storage unit 374, or a combination thereof.

It has been discovered that the displayed image quality 220, the altered image quality 222, the displayed gamut 418, and the altered gamut 420 provide characterization of the transmission property 212 of the viewing aide 108. With the characterization, the displayed image quality 220, the altered image quality 222, the displayed gamut 418, and the altered gamut 420 allow for the display system 100 to compensate for the transmission property 212 of the viewing aide 108.

It has also been discovered that the displayed gamut 418 and the altered gamut 420 provide a quantification of the transmission property 212 of the viewing aide 108. With the quantification, the display system 100 can utilize gamut mapping process for negating the transmission property 212 of the viewing aide 108.

After the transmission property 212 for the viewing aide 108 has been characterized, the control can be passed to the profile determination module 404. The profile determination module 404 is for determining the correction profile 224 of FIG. 2.

The profile determination module 404 can determine the correction profile 224 in a variety ways. For example, the profile determination module 404 can determine the correction profile based on the displayed image quality 220 and the altered image quality 222.

Continuing with the example, the profile determination module 404 can determine the correction profile 224 by calculating a difference between the displayed image quality 220 and the altered image quality 222. The profile determination module 404 can determine the correction profile 224 as the difference in the instances of the color value 206, the brightness value 210, or a combination thereof corresponding to the displayed image quality 220 and the altered image quality 222.

For further example, the profile determination module 404 can treat the difference between the displayed image quality 220 and the altered image quality 222 as a gamut mapping problem and mathematically describe the differences as a two-dimensional nonlinear mapping problem using the color gamut 208. The profile determination module 404 can use polynomial model for characterizing the difference between the displayed image quality 220 and the altered image quality 222. The profile determination module 404 can determine the correction profile 224 as a set of polynomial coefficients via numerical fitting method using the polynomial model.

For a more specific example, the profile determination module 404 can use mathematical expressions to describe color distortion generated by 3D glasses. The profile determination module 404 can use the following equations to define the gamut mapping relations between the displayed image quality 220 and the altered image quality 222:

$$B = T(A) \qquad \text{Equation (1), and}$$

$$A = T^{-1}(B) \qquad \text{Equation (2).}$$

Continuing with the example, A can represent the displayed image quality 220 and B can represent the altered image quality 222 for equations 1 and 2. The function T( ) can represent the forward 2 dimensional transformation that converts the displayed image quality 220 to the altered image quality 222. The function $T^{-1}($ ) can represent the inverse transformation from the altered image quality 222 to the displayed image quality 220, as characterized by the correction profile 224.

Continuing with the example, the function T( ) can be a nonlinear function based on a 3rd or 4th order bivariate polynomials. For displayed image quality 220 of [$a_1, a_2$] and altered image quality 222 of [$b_1, b_2$], equations (1) may be re-formulated as in Equation (3) using the matrix format:

$$[b_1 \ b_2] = [1 \ a_1 \ a_2 \ a_1a_2 \ a_1^2 \ a_2^2 \ a_1^2a_2 \ a_1a_2^2 \ a_1^3 \ a_2^3] \begin{bmatrix} t_0^1 & t_0^2 \\ t_1^1 & t_1^2 \\ t_2^1 & t_2^2 \\ t_3^1 & t_3^2 \\ t_4^1 & t_4^2 \\ t_5^1 & t_5^2 \\ t_6^1 & t_6^2 \\ t_7^1 & t_7^2 \\ t_8^1 & t_8^2 \\ t_9^1 & t_9^2 \end{bmatrix} \qquad (3)$$

Continuing with the example, Equation (2) may be re-formulated in the same format as in Equation (3). The polynomial coefficients can be obtained with the image analyzer 110.

Continuing with the example, color compensation can be simply derived using the equations below. Equation (4) represents the color transformation realized after the color compensation. C can represent the adjusted output image 226 of FIG. 2. After the color transformation and distortion through the 3D glasses, as represented by TO, the viewer or the image analyzer 110 will see the true color A.

$$A = T(C) \qquad \text{Equation (4)}$$

To obtain the adjusted output image 226 as represented by C, the inverse transformation can be applied to both sides of Equation (4) to get Equation (5).

$$T^{-1}(A) = T^{-1}(T(C)) \qquad \text{Equation (5)}$$

Finally Equation (5) can be rewritten as in Equation (6) because of the canceled transformations, with Equation (6) describing the relationship between the adjusted output image 226, the correction profile 224, and the perception of the displayed image quality 220.

$$C = T^{-1}(A) \qquad \text{Equation (6)}$$

Also for example, the profile determination module 404 can determine the correction profile 224 based on the displayed gamut 418 and the altered gamut 420. The profile determination module 404 can calculate a difference between the displayed gamut 418 and the altered gamut 420. The profile determination module 404 can determine the correction profile 224 as a vector between the locations represented by the displayed gamut 418 and the altered gamut 420.

The correction profile 224 can be the difference value between the displayed image quality 220 and the altered image quality 222, a coefficient or a ratio based on the displayed image quality 220 and the altered image quality 222, or a combination thereof. The correction profile 224 can be the vector, a map, a link, or a combination thereof between the displayed image quality 220 and the altered image quality 222. The correction profile 224 can also be an equation having the displayed image quality 220, the altered image quality 222, or a combination thereof as an input variable.

The profile determination module 404 can use the first control unit 312, the second control unit 334, the analyzer control unit 372, or a combination thereof to calculate the correction profile 224. The correction profile 224 can be communicated and shared between the first device 102, the second device 106, the viewing aide 108, the image analyzer 110, or a combination thereof using the first communication unit 316 of FIG. 3, the second communication unit 336 of FIG. 3, the viewer communication unit 366 of FIG. 3, the analyzer communication unit 376 of FIG. 3, or a combination thereof.

The profile determination module 404 can store the correction profile 224 in the first storage unit 314, the second storage unit 346, the viewer storage unit 364 of FIG. 3, the analyzer storage unit 374 of FIG. 3, or a combination thereof. For example, the profile determination module 404 can store the correction profile 224 in the viewing device, such as a television or a computer, a database within a server, a webpage on the internet, a memory device within the 3D glasses, the color analyzer, or a combination thereof.

It has been discovered that the correction profile 224 provides accurate viewing through the viewing aide 108. It has been discovered that the correction profile 224 provides corrections to negate transmission property 212 of the viewing aide 108. The display system 100 can adjust output images with the correction profile 224 to have the output images viewed as intended and without the degradation resulting from the transmission property 212 of the viewing aide 108.

After determining the correction profile 224, the control flow can pass to the receiver module 406. The receiver module 406 is for receiving information for displaying on the first display interface 330.

The receiver module 406 can have an image receiver module 422 and a profile communication module 424. The image receiver module 422 is for receiving an intended image 426 from the second device 106, such as a broadcasting station, a DVD player, a game console, a cell phone, a smart phone, a portable media player, a server, or a computer. The intended image 426 can be an image or a sequence of images for electronically displaying on the first display interface 330.

The profile communication module 424 is for receiving the correction profile 224. The profile communication module 424 can receive the correction profile 224 by using the first communication unit 316 to access the correction profile 224 stored on the second device 106, the viewing aide 108, the image analyzer 110, or a combination thereof.

For example, the profile communication module 424 can receive the correction profile 224 by accessing the correction profile 224 stored on the second device 106, such as a server, a database on the internet, a DVD player, a game console, a computer, a media player, a storage medium, or a combination thereof. For further example, the profile communication module 424 can receive the correction profile 224 by accessing the correction profile 224 stored on the image analyzer 110, such as a smart phone having image or color analysis feature, a TV remote controller, an independent color or image analysis device, or a combination thereof.

Also for example, the profile communication module 424 can receive the correction profile 224 by accessing the correction profile 224 stored on the viewing aide 108, such as 3D glasses, lenses, or filters. The profile communication module 424 can also receive an aide-identifier 428 for identifying the viewing aide 108. The profile communication module 424 can access the first storage unit 314, the second storage unit 346, the viewer storage unit 364 of FIG. 3, the analyzer storage unit 374 of FIG. 3, or a combination thereof for the correction profile 224 corresponding to the aide-identifier 428.

After receiving the intended image 426, the correction profile 224, or a combination thereof, the control flow can pass to the compensation module 408. The compensation module 408 is for adjusting the intended image 426 for viewing through the viewing aide 108. Since images displayed on the first display interface 330 will be degraded due to the transmission property 212 of the viewing aide 108, the compensation module 408 can generate the adjusted output image 226 based on the correction profile 224 for displaying on the first display interface 330 to view or perceive the intended image 426 through the viewing aide 108.

The compensation module 408 can generate the adjusted output image 226 by adjusting the intended image 426 with the correction profile 224. The compensation module 408 can adjust the intended image 426 by adjusting the color value 206, the brightness value, or a combination thereof for the intended image 426 by the correction profile 224.

For example, the compensation module 408 can subtract or add the correction profile 224 to the color value 206, the brightness value, or a combination thereof for the intended image 426. Also for example, the compensation module 408 can adjust the intended image 426 by using the color value 206, the brightness value, or a combination thereof for the intended image 426 as an input to the correction profile 224, such as in a function or an equation. The output produced by the correction profile 224 and the above inputs can be the adjusted output image 226.

For further example, the compensation module 408 can use the color value 206, the brightness value, or a combination thereof for the intended image 426 to look up a corresponding value in the correction profile 224, such as in a look up table mapping or linking various values. The corresponding values indicated by the correction profile 224 can be the adjusted output image 226.

For another example, the compensation module 408 can apply the polynomial model and the corresponding coefficients of the correction profile 224 to the intended image 426. The compensation module 408 can use Equations (1)-(6), as described above, to adjust the intended image 426. The generated result can be the adjusted output image 226.

The compensation module 408 can also generate the adjusted output image 226 using an image converter module 432, an adjustment module 434, and a coordinate converter module 436.

The image converter module 432 is for converting the intended image 426 into an intended gamut 438. The intended gamut 438 is set of values representing a location on the color gamut 208 corresponding to the intended image 426. The image converter module 432 can match the intended image 426 to a color in the color gamut 208. The image converter module 432 can match an instance of the color value 206, the brightness value 210, or a combination thereof of the intended image 426 to an instance of the color value 206, the brightness value 210, or a combination thereof on the color gamut 208.

The adjustment module 434 is for adjusting the intended gamut 438 by the correction profile 224. The adjustment module 434 can adjust the intended gamut 438 by calculating adjusted coordinates 440. The adjusted coordinates 440 are set of values representing a location on the color gamut 208 corresponding to the adjusted output image 226. The adjustment module 434 can calculate the adjusted coordinates 440 in a variety of ways.

For example, the adjustment module 434 can calculate the adjusted coordinates 440 by adding or subtracting the value or the vector represented by the correction profile 224 to the intended gamut 438. For further example, the adjustment module 434 can use the gamut mapping model and use the set of polynomial coefficients represented by the correction profile 224 and the intended gamut 438 to calculate the adjusted coordinates 440.

Also for example, the adjustment module 434 can calculate the adjusted coordinates 440 by identifying the intended gamut 438 among input values on the correction profile 224 represented as the lookup table or the mapping. The adjustment module 434 can calculate the adjusted coordinates 440 by setting the value corresponding to the intended gamut 438 on the correction profile 224.

The coordinate converter module 436 is for converting coordinate values into an image. The coordinate converter module 436 can covert the adjusted coordinates 440 to the adjusted output image 226. The coordinate converter module 436 can use a reverse or an inversion of the process used by the image converter module 432 to convert the adjusted coordinates 440 to the adjusted output image 226. The coordinate converter module 436 can generating the adjusted output image 226 by determining the color value 206, the brightness value 210, or a combination thereof corresponding to the adjusted coordinates 440 on the color gamut 208.

It has been discovered that the adjusted output image 226 and the adjusted coordinates 440 provide accurate depiction of the intended image 426 through the viewing aide 108. It has been discovered that the adjusted output image 226 and the adjusted coordinates 440 provide corrections to negate the transmission property 212 of the viewing aide 108 to have the user view intended colors and brightness of the displayed image. The display system 100 can display the adjusted output image 226 based on the adjusted coordinates 440, which will be degraded due to the transmission property 212 of the viewing aide 108. The degradation will allow a viewer to perceive the adjusted output image 226 as the intended image 426 through the viewing aide 108.

After generating the adjusted output image 226, the control flow can pass to the display module 410. The display module 410 can use the first display interface 330, the first communication unit 316, the second communication unit 336, the viewer communication unit 366, the analyzer communication unit 376, or a combination thereof to communicate the adjusted output image 226.

The display module 410 can communicate the adjusted output image 226 by sending and receiving the adjusted output image 226 between various devices, including the first device 102, the second device 106, the image analyzer 110, or a combination thereof. The display module 410 can also communicate the adjusted output image by displaying the adjusted output image 226 on the first display interface 330 for viewing the intended image 426 through the viewing aide 108 from the adjusted output image 226.

For example, the display module 410 can display the adjusted output image 226, including a right image and a left image overlapped for three dimensional depictions. Displaying the adjusted output image 226 can offset the transmission property 212 of the viewing aide 108. The display module 410 can display the adjusted output image 226 for viewing the intended image 426 in three dimensions through the viewing aide 108.

The display system 100 has been described with module functions or order as an example. The display system 100 can partition the modules differently or order the modules differently. For example, the functions of the image calibration module 402 and the profile determination module 404 can be merged into one module or the image converter module 432 can be part of the receiver module 406.

Also for example, the image calibration module 402 can be on the first device 102, the second device 106, or a combination thereof. For further example, the profile determination module 404 can be shared between the first device 102, the second device 106, the image analyzer 110, or a combination thereof.

The modules described in this application can be hardware implementation or hardware accelerators having active circuitry, passive circuitry, or a combination thereof in the first control unit 316 of FIG. 3 or in the second control unit 338 of FIG. 3. The modules can also be hardware implementation or hardware accelerators having active circuitry, passive circuitry, or a combination thereof within the first device 102 or the second device 106 but outside of the first control unit 316 or the second control unit 338, respectively.

The physical transformation from the correction profile 224 results in the movement in the physical world, such as the viewer's perception of or reaction to the intended image 426 from the adjusted output image 226 with the use of the viewing aide 108. Movement in the physical world results in changes to the correction profile 224 by further adjusting the correction profile 224 based on detecting the adjusted output image 226 through the viewing aide 108.

Figure 5:
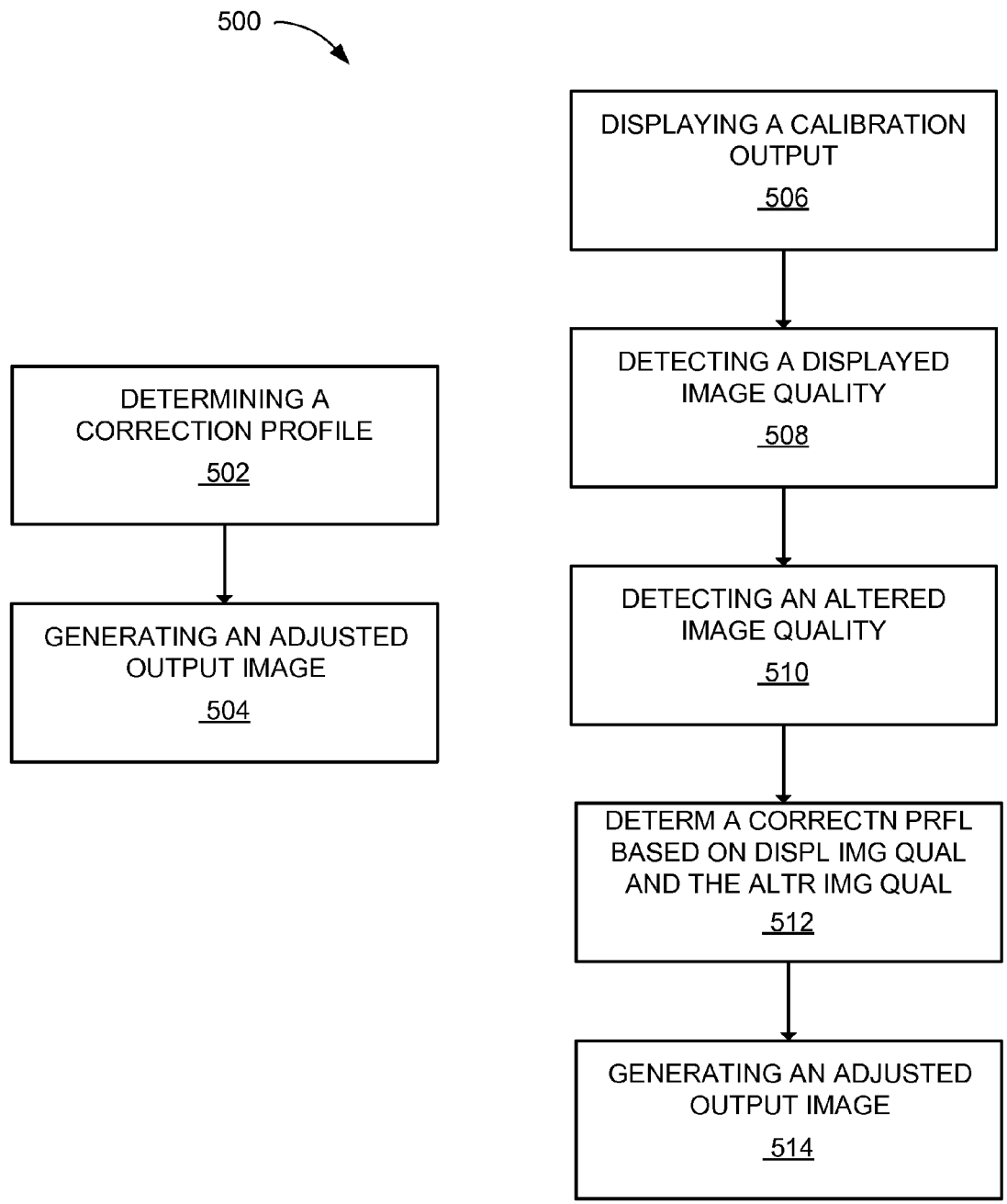
FIG. 5 is a flow chart of a method of operation of a display system in a further embodiment of the present invention.

Referring now to FIG. 5, therein is shown a flow chart of a method 500 of operation of a display system 100 in a further embodiment of the present invention. The method 500 includes: determining a correction profile for adjusting an intended image based on a viewing aide in a block 502; and generating an adjusted output image based on the correction profile for displaying on a device and for perceiving the intended image through the viewing aide in a block 504. The method 500 can further include: displaying a calibration output for calibrating using a display interface in a block 506; detecting a displayed image quality for measuring the calibration output directly from the display interface in a block 508; detecting an altered image quality for measuring the calibration output through a viewing aide in a block 510; determining a correction profile based on the displayed image quality and the altered image quality for displaying an intended image adjusted by the correction profile on a device in a block 512; and generating an adjusted output image based on the correction profile for displaying on the device and for perceiving the intended image through the viewing aide in a block 514.

It has been discovered that the displayed image quality 220 of FIG. 2, the altered image quality 222 of FIG. 2, the displayed gamut 418 of FIG. 4, and the altered gamut 420 of FIG. 4 provide characterization, quantization, and processing of the transmission property 212 of FIG. 2 of the viewing aide 108 of FIG. 1. With the characterization, the displayed image quality 220, the altered image quality 222, the displayed gamut 418, and the altered gamut 420 allow for the display system 100 of FIG. 1 to compensate for the transmission property 212 of the viewing aide 108.

It has further been discovered that the correction profile 224 of FIG. 2 provides accurate viewing through the viewing aide 108 by providing corrections to negate transmission property 212 of the viewing aide 108. The display system 100 can adjust output images with the correction profile 224 to have the output images viewed as intended and without the degradation resulting from the transmission property 212 of the viewing aide 108. It has been discovered that the adjusted output image 226 of FIG. 2 and the adjusted coordinates 440 of FIG. 4 provide accurate depiction of the intended image 426 of FIG. 4 through the viewing aide 108 and negate the transmission property 212 of the viewing aide 108 to have the user view intended colors and brightness of the displayed image.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance.

These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a display system comprising:
communicating a calibration output for calibrating using a display interface;
determining a correction profile with a control unit based on a nonlinear bivariate polynomial according to a displayed image quality for representing the calibration output measured directly from the display interface and based on an altered image quality for representing the calibration output measured through a viewing aide, the correction profile for presenting an intended image through the viewing aide based on adjustments with the correction profile on a device; and
generating an adjusted output image based on the correction profile for displaying on the device and for perceiving the intended image through the viewing aide.

2. The method as claimed in claim 1 wherein determining the correction profile includes receiving the correction profile.

3. The method as claimed in claim 1 further comprising communicating the adjusted output image for viewing the intended image in three dimension through the viewing aide.

4. The method as claimed in claim 1 further comprising:
calculating a displayed gamut based on the displayed image quality;
calculating altered gamut based on the altered image quality; and
wherein:
determining the correction profile includes determining the correction profile based on the displayed gamut and the altered gamut.

5. The method as claimed in claim 1 wherein generating the adjusted output image includes:
calculating an intended gamut based on the intended image; and
adjusting the intended gamut by the correction profile.

6. A display system comprising:
a control unit including one or more processors configured to:
communicate a calibration output for calibrating using a display interface;
determine a correction profile based on a bivariate polynomial according to a displayed image quality for representing the calibration output measured directly from the display interface and based on an altered image quality for representing the calibration output measured through a viewing aide, the correction profile for presenting an intended image through the viewing aide based on adjustments with the correction profile on a device; and
a communication unit, coupled to the control unit, configured to transmit the correction profile for communicating the correction ruffle with another device to adjust an image displayed at the another device according to the correction profile.

7. The system as claimed in claim 6 wherein the storage interface is configured to receive the correction profile.

8. The system as claimed in claim 6 further comprising a display interface configured to communicate the adjusted output image for viewing the intended image in three dimension through the viewing aide.

9. The system as claimed in claim 6 wherein the control unit is configured to:
calculate a displayed gamut based on the displayed image quality;
calculate an altered gamut based on the altered image quality; and
determine the correction profile based on the displayed gamut and the altered gamut.

10. The system as claimed in claim 6 wherein the control unit is configured to:
calculate an intended gamut based on the intended image; and
adjust the intended gamut by the correction profile.

11. The system as claimed in claim 6 wherein the control unit is configured to:
determine the correction profile for correcting alterations to light resulting from traversal through the viewing aide; and
generate an adjusted output image based on the intended image and the correction profile for displaying the adjusted output image on the device and for perceiving the intended image in viewing the adjusted output image through the viewing aide.

12. The system as claimed in claim 6 wherein the storage interface is configured to access an aide-identifier for identifying the viewing aide.

13. The system as claimed in claim 6 further comprising a communication unit configured to communicate the adjusted output image for viewing the intended image through the viewing aide.

14. The system as claimed in claim 6 wherein the control unit is configured to adjust a color value, a brightness value, or a combination thereof of the intended image by the correction profile.

15. The system as claimed in claim 6 wherein the control unit is configured to determine the correction profile based on a displayed image quality and an altered image quality.

16. The method as claimed in claim 1 wherein:
determining the correction profile includes determining the correction profile for correcting alterations to light resulting from traversal through the viewing aide; and
generating an adjusted output image based on the intended image and the correction profile for displaying the adjusted output image on the device and for perceiving the intended image in viewing the adjusted output image through the viewing aide.

17. The method as claimed in claim 1 wherein determining the correction profile includes determining an aide-identifier for identifying the viewing aide.

18. The method as claimed in claim 1 further comprising communicating the adjusted output image for viewing the intended image through the viewing aide.

19. The method as claimed in claim 1 wherein generating the adjusted output image includes adjusting a color value, a brightness value, or a combination thereof of the intended image by the correction profile.

20. The method as claimed in claim 1 wherein determining the correction profile includes determining the correction profile based on a displayed image quality and an altered image quality.

* * * * *